United States Patent [19]
Galasso et al.

[11] Patent Number: 5,242,178
[45] Date of Patent: Sep. 7, 1993

[54] HITCH FOR ATTACHING A TRAILER TO A BICYCLE

[75] Inventors: Mario M. Galasso, Norwalk; Christopher D. Hageman; Timothy J. Fenton, both of New Canaan, all of Conn.

[73] Assignee: Cannondale Corporation, Georgetown, Conn.

[21] Appl. No.: 931,702

[22] Filed: Aug. 18, 1992

[51] Int. Cl.⁵ .............................................. B62K 27/12
[52] U.S. Cl. ...................................... 280/204; 280/292
[58] Field of Search .............. 280/202, 204, 292, 495, 280/492, 503, 504; 403/321, 322, 326, 330, 119

[56] References Cited

U.S. PATENT DOCUMENTS

| | | | |
|---|---|---|---|
| 3,312,299 | 4/1967 | Kuecker | 280/204 |
| 3,567,249 | 3/1971 | Robinson | 280/204 |
| 3,993,320 | 11/1976 | Robinson | 280/204 |
| 4,721,320 | 1/1988 | Creps et al. | 280/204 |

*Primary Examiner*—Joseph F. Peters, Jr.
*Assistant Examiner*—Anne E. Bidwell
*Attorney, Agent, or Firm*—Brumbaugh, Graves, Donohue & Raymon

[57] ABSTRACT

A hitch for attaching a trailer to a bicycle comprises a mounting bracket adapted to be releasably attached to a chain stay of the bicycle frame and a resiliently flexible coupling member of an elastomeric material attached to the mounting bracket and adapted to be attached to a boom tube that is in turn attached to the trailer. The coupling member provides universal articulation between the mounting bracket and the boom tube. The mounting bracket includes a bracket body member having a chain stay-engaging portion and a coupling attachment portion extending from the chain stay-engaging portion, the coupling being attached to the attachment portion of the bracket body, a bracket claw member having a chain stay-engaging portion, the claw member being pivotally coupled adjacent one end of the chain stay-engaging portion thereof to the body member, and a releasable/adjustable fastener coupled between the chain stay-engaging portion of the bracket body member and the other end of the chain stay-engaging portion of the claw member for selectively connecting the chain stay-engaging portions of the body member and claw member to each other in clamped relation to the chain stay.

8 Claims, 4 Drawing Sheets

HITCH FOR ATTACHING A TRAILER TO A BICYCLE

BACKGROUND OF THE INVENTION

Cannondale Corporation, the assignee of the present invention, introduced as its first product the world's first bicycle trailer over twenty years ago. Over the years, bicycle trailers have attained increasing popularity for transporting articles of all kinds, such as camping gear, groceries and other inanimate cargos of every description, and small children.

For balance as a bicycle is ridden (side to side swaying) and for maneuvering (turning and traversing changing ground slopes), it is necessary for the bicycle to articulate universally relative to the trailer. On the other hand, essentially free universal articulation between the bicycle and the trailer results in considerable handling problems for the cyclist and excessive yawing and pitching motions of the trailer. This has long been recognized and solved by providing hitches for coupling bicycles to bicycle trailers that incorporate resilient elements for restraining motions of the trailer relative to the bicycle.

The hitches used by Cannondale and others have joined a tongue on the trailer to the bicycle seat post. More recently, bicycle trailers have been connected to bicycles by hitches that are mounted on the chain stay of the bicycle frame opposite from the chain side. (In virtually all bicycles, the chain is on the right side, so the trailer hitches are attached to the left chain stay.) The presently known hitches for attaching trailers to bicycle chain stays are not entirely satisfactory from the points of view of optimal function, ease of attaching them to and detaching them from the bicycle, and adaptability to chain stays of various diameters.

SUMMARY OF THE INVENTION

One object of the present invention is to provide a hitch for attaching a bicycle trailer to a bicycle that provides improved function, especially in that it provides maximum restraint against pitching of the trailer and lesser restraints against yawing and rolling of the trailer. Another object is to provided a trailer hitch that is easy to attach to and detach from the bicycle. It is also desired to provide a hitch that is easily adjusted to fit chain stays of various sizes.

Then foregoing objects are attained, in accordance with the present invention, by a hitch that comprises a mounting bracket adapted to be releasably attached to a chain stay of the bicycle frame and a resiliently flexible coupling member of an elastomeric material attached to the mounting bracket and adapted to be attached to a boom tube that is in turn attached to the trailer. The coupling member provides universal articulation between the mounting bracket and the boom tube. The mounting bracket includes a bracket body member having a chain stay-engaging portion and a coupling attachment portion extending from the chain stay-engaging portion, the coupling being attached to the attachment portion of the bracket body, a bracket claw member having a chain stay-engaging portion, the claw member being pivotally coupled adjacent one end of the chain stay-engaging portion thereof to the body member, and a releasable/adjustable fastener coupled between the chain stay-engaging portion of the bracket body member and the other end of the chain stay-engaging portion of the claw member for selectively connecting the chain stay-engaging portions of the body member and claw member to each other in clamped relation to the chain stay.

In a preferred embodiment, the bracket body member has a pair of spaced-apart arm portions defining a slot between them. The arms have a multiplicity of aligned holes, the claw member has a hole through it, and the claw member is pivotally attached to the body member by a pin received through a selected pair of the aligned holes in the arm portions of the bracket body and the hole in the claw member. By selection of the holes in the bracket body arms, the mounting bracket can be adjusted to fit chain stays of different sizes. The arms of the body member and the fastener of the mounting bracket straddle the chain stay.

The coupling member, preferably, includes an elongated arm portion of substantially uniform cross-section along its length. The area moment of inertia of the cross-section is substantially greater in the vertical direction than in the horizontal direction with respect to the bicycle such that the flexibility under lateral and torsional loads is substantially greater than the flexibility under vertical loads. Accordingly, pitch of the trailer relative to the bicycle is more greatly restrained than are yaw and rolling.

The attachment portion of the bracket body is, advantageously, bifurcated such as to define spaced-apart leg portions, and the coupling member is received between the leg portions in close-fitting relation thereto. The coupling member includes a cylindrical boss portion at its end remote from the bracket, the boss portion being adapted to be received telescopically in the boom tube and joined to the boom tube by a fastener.

The fastening device, in a preferred form, includes a screw that passes though a hole in the bracket body member and having an eccentric quick release lever at one end that engages the bracket body member and a barrel nut that is threaded onto the other end. The barrel nut is releasably received in a groove in the bracket claw member. The groove is, preferably, offset toward the bracket body member relative to the hole in the bracket claw member. The offset permits the screw to be relatively short but also permits a desirable range of adjustment to be made in the space between the chain stay-engaging portions of the body member and claw member, in which the chain stay is receiving in clamped relation.

For a better understanding of the invention, reference may be made to the following description of an exemplary embodiment, taken in conjunction with the accompanying drawings. The embodiment is shown in the drawings as it would be mounted on the left side chain stay of the bicycle, and all references herein to "right," "left," "front," and "rear" are with reference to the bicycle.

DESCRIPTION OF THE EMBODIMENT

Figure 1:
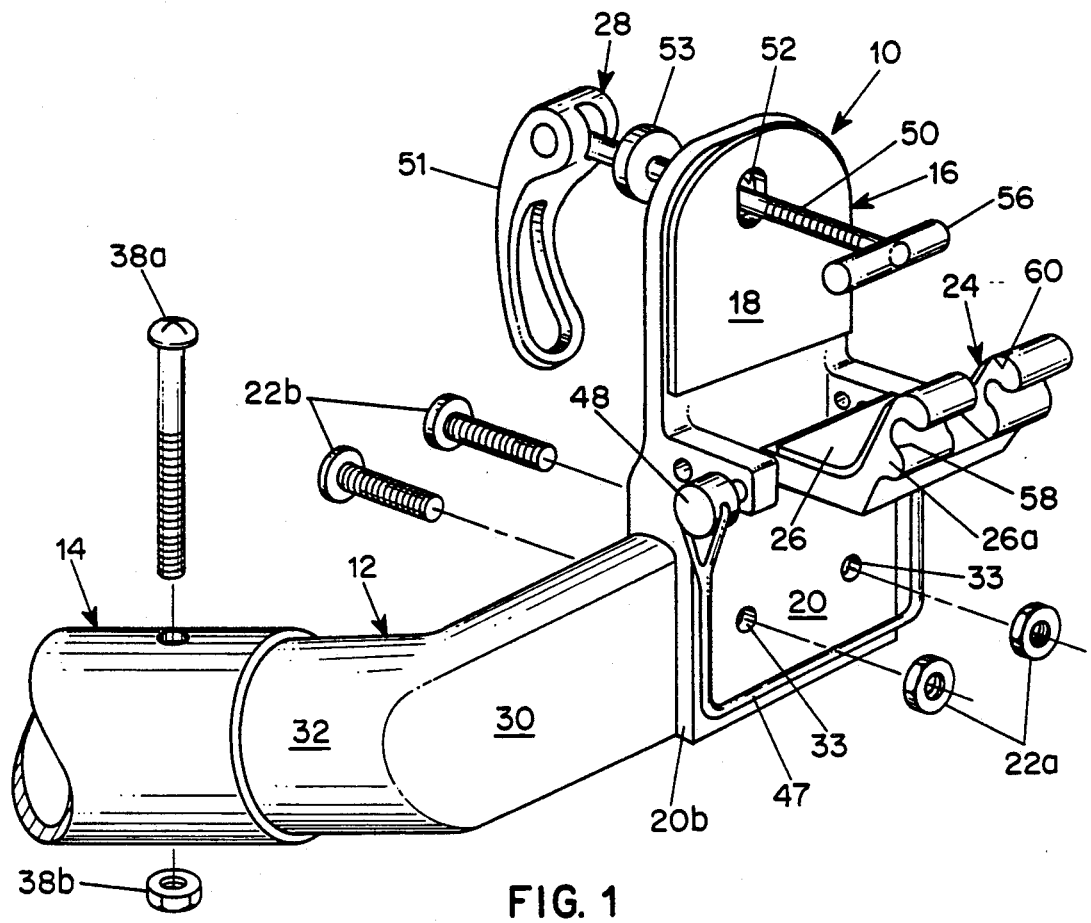
FIG. 1 is a partially exploded, three-quarter pictorial view of the right side (the side that faces inwardly toward the bicycle wheel) of the embodiment, the view being taken from above and behind.
Figure 2:
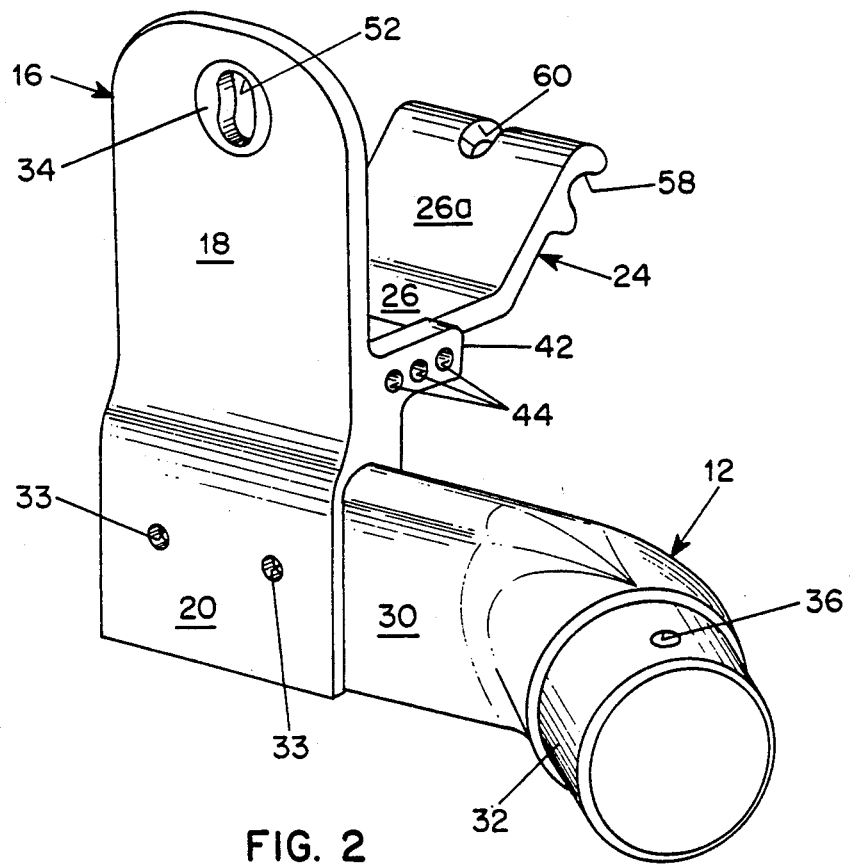
FIG. 2 is three-quarter pictorial view of the left side of the hitch taken from above and behind, the fasteners being omitted.
Figure 3:
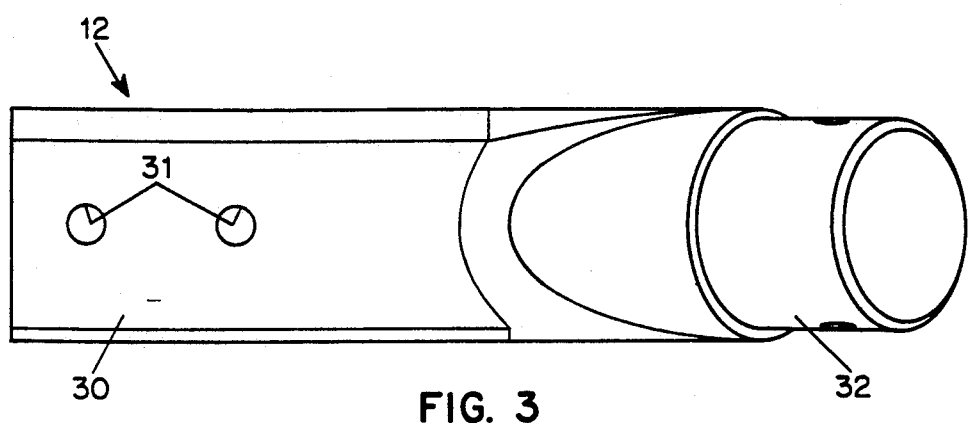
FIGS. 3 to 6 are, respectively, the following views of the coupling member: elevational of the left side; bottom plan; three-quarter pictorial of the left side taken from below; and rear elevational.
Figure 4:
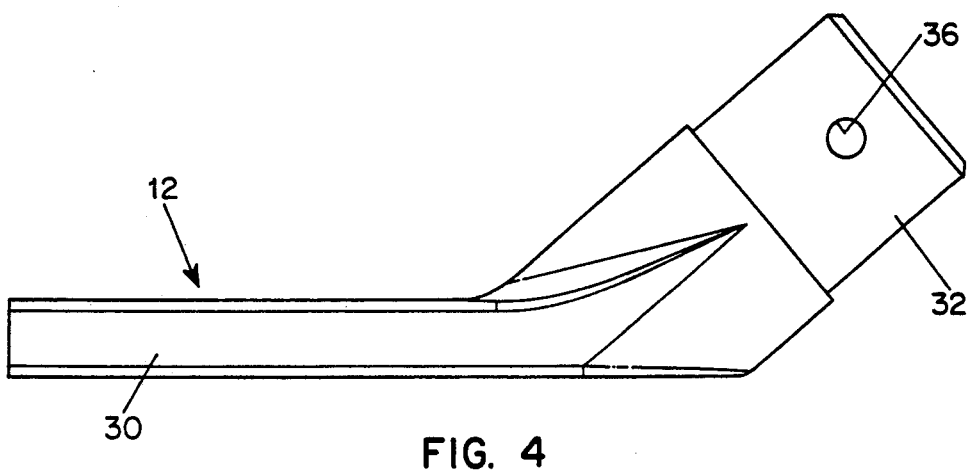
Figure 5:
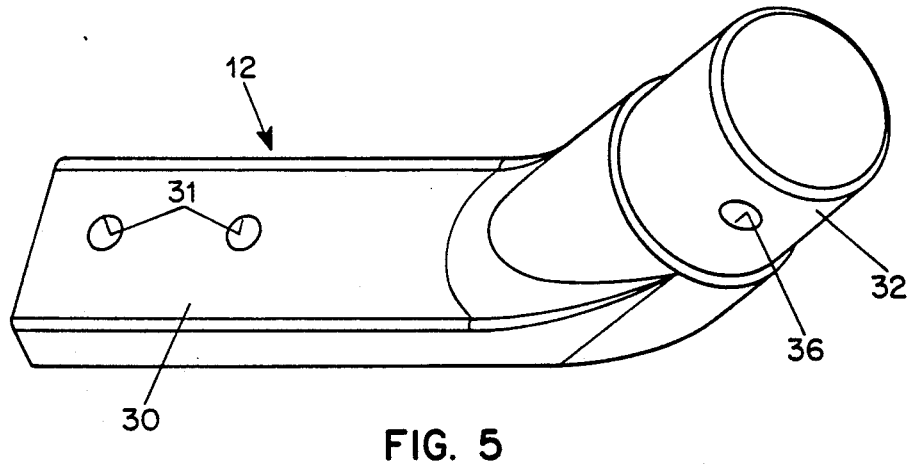
Figure 6:
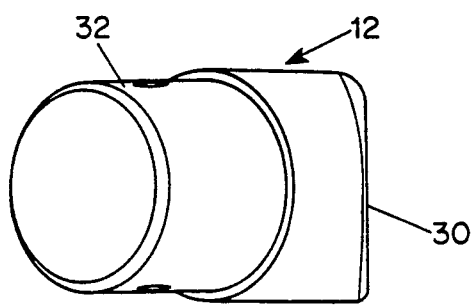
Figure 7:
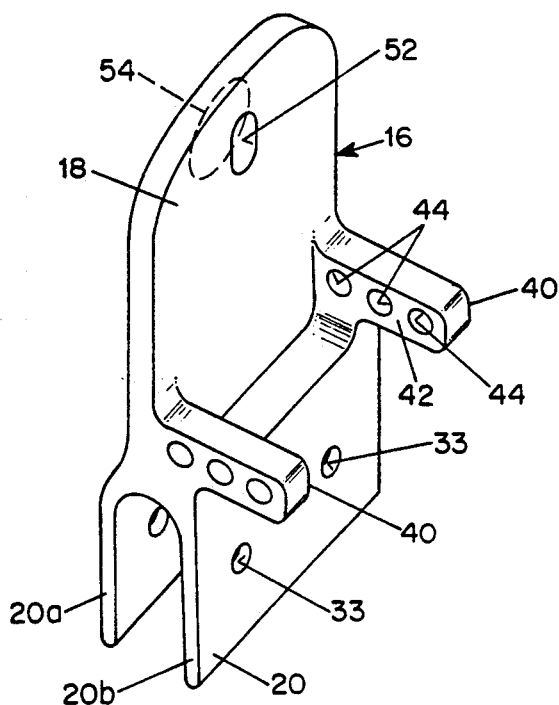
FIGS. 7 to 10 are, respectively, the following views of the body member of the mounting bracket: three-quarter pictorial of the right side taken from the rear and above; elevational of the right side; rear elevational; and top plan.
Figure 8:
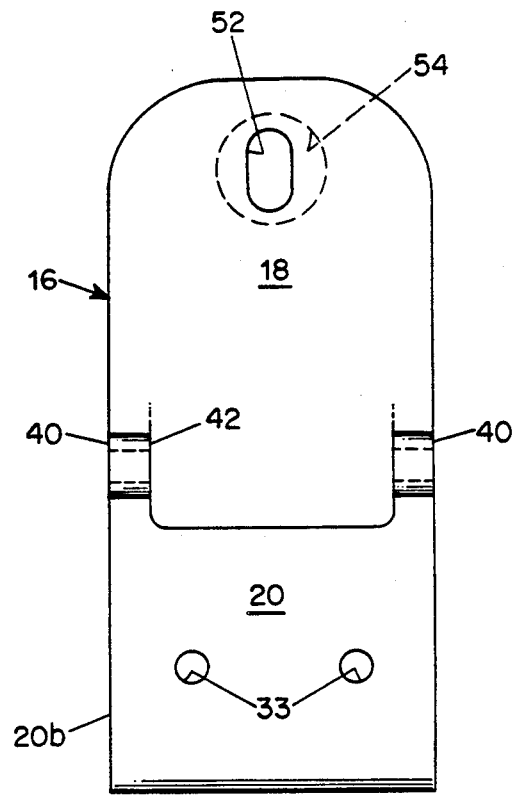

Referring to FIGS. 1 and 2, the hitch comprises a mounting bracket 10 adapted to be releasably attached to a chain stay of the bicycle frame (not shown) and a resiliently flexible coupling member 12 of an elastomeric material attached to the mounting bracket 10 and adapted to be attached to a boom tube 14 that is in turn attached to the trailer (not shown). The coupling member 12 provides universal articulation between the mounting bracket 10 and the boom tube 14. The mounting bracket 10 includes a bracket body member 16 having a chain stay-engaging portion 18 and a coupling attachment portion 20 extending from the chain stay-engaging portion. The coupling member is attached to the attachment portion 20 by nuts 22a and bolts 22b. A bracket claw member 24, which has a chain stay-engaging portion 26, is pivotally coupled adjacent one end of the chain stay-engaging portion thereof to the bracket body member 16. A releasable/adjustable fastener 28 is coupled between the chain stay-engaging portion 18 of the bracket body member and the other end of the chain stay-engaging portion 26 of the claw member 24 for selectively connecting the chain stay-engaging portions 18 and 26 of the body member and claw member to each other in clamped relation on the chain stay.

Referring next to FIGS. 3 to 6, the coupling member 12 includes an elongated arm portion 30 of substantially uniform cross-section along its length. The attachment portion 20 of the bracket body member 16 is bifurcated such as to define spaced-apart leg portions 20a and 20b (see FIGS. 7 to 10). Part of the arm portion of the coupling member is received between the leg portions in close-fitting relation and is affixed by the bolts and nuts 22a, 22b, which pass through holes 31 in the arm portion 30 and holes 33 in the leg portions 20a and 20b of the bracket body member 16. A cylindrical boss portion 32 at the rear end of the coupling member 12 remote from the hitch bracket is received telescopically within the boom tube 14. The bass portion 32 has a hole 36 for a bolt 38a that, along with the nut 38b, fastens the boom tube to the hitch coupling member. The boss portion 32 of the coupling member extends obliquely out and to the rear in alignment with the front part of the boom tube 14, the front end of which lies oblique to the longitudinal axis of the bicycle in order to provide clearance between the boom tube and the rear wheel of the bicycle for turning.

The coupling member 12 is molded from an elastomeric material, such as a urethane having a Durometer of 95-A. The area moment of inertia of the cross-section of the arm portion is substantially greater in the vertical direction than in the horizontal direction (with respect to the bicycle) such that the flexibility under lateral and torsional loads is substantially greater than the flexibility under vertical loads. The relatively greater flexibility of the coupling member in torsion permits the bicycle to lie on its side on the ground while the trailer remains upright, so that if the bicycle should accidentally overturn, the trailer will not turn over with it. The lesser flexibility in the vertical direction minimizes pitching motions of the trailer and provided enhanced load-bearing. Even though the greater flexibility of the coupling member in the lateral direction reduces the restraint of the hitch on yawing motions of the trailer, such restraint is adequate. Moreover, the lesser restraint provided by the coupling member on lateral and torsional motions of the hitch relative to the boom tube allows the bicycle to rock from side to side when the rider peddles hard without causing large yawing motions of the trailer—the trailer can maintain a more stable track behind the bicycle with lateral flexibility in the hitch.

The bracket body member 16 (see FIGS. 7 to 10) has a pair of spaced-apart arm portions 40 defining a slot 42 between them. The arm portions 40 have a multiplicity of aligned holes 44, the claw member 24 (FIGS. 11 to 14) has a hole 46 through it, and the claw member is pivotally attached to the body member by a pin 48 (FIG. 1) received through a selected pair of the aligned holes 44 in the arm portions of the bracket body member and the hole 46 in the claw member and held in place by a spring clip 47. By selection of the holes in the bracket body arms, the mounting bracket can be adjusted to fit chain stays of different sizes. In bicycles with unusually slender chain stays, a shim (not shown), which is made of a 90A Durometer elastomer and is provided with the hitch for optional use, is inserted between the portion 18 of the bracket body member 16 and the stay.

The bracket is attached to the chain stay by the fastener 28 (FIG. 1), which includes a screw 50 that passes though an oblong hole 52 in the bracket body member 16 and has an eccentric quick release lever 51 at one end. A washer 53, which has a spherical face that nests in a matching recess 54 in the bracket body member, is engaged between the release lever and the body member and allows the screw to swivel up and down in the hole 50. A barrel nut 56 is threaded onto the other end of the screw and is releasably received in a transverse groove 58 in the bracket claw member 24. A notch 60 in the claw member accepts the end portion of the screw adjacent the barrel nut. The groove 58 is offset toward the bracket body member relative to the pivot hole 46 in the bracket claw member by way of the inturned upper part 26a of the stay-engaging portion 26 of the claw member. The offset permits the screw 50 to be relatively short while also enabling a suitable range of adjustment to be made in the space between the chain stay-engaging portions of the body member and claw member, in which the chain stay is received in clamped relation, for various sizes of chain stays.

Figure 9:
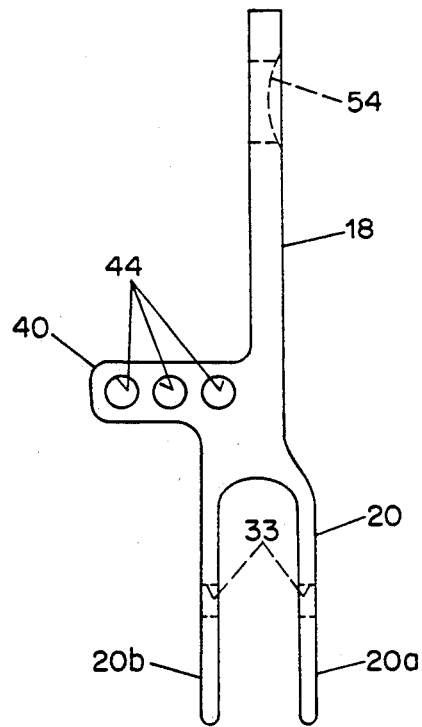
Figure 10:
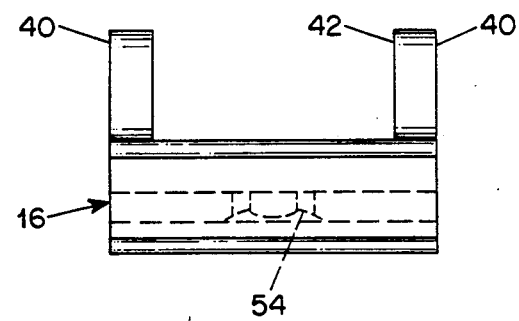
Figure 11:
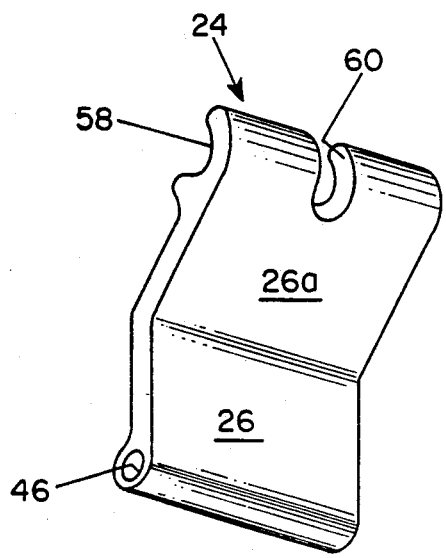
FIGS. 11 to 14 are, respectively, the following views of the claw member of the mounting bracket: three-quarter pictorial of the left side taken from the front and below; bottom plan; right side elevational; and front elevational.
Figure 12:
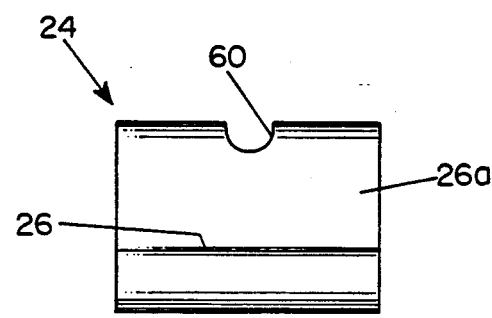
Figure 13:
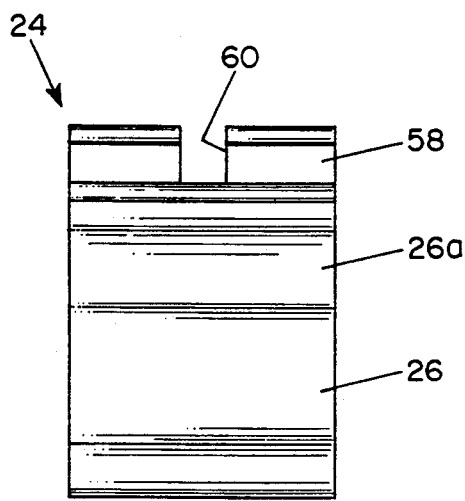
Figure 14:
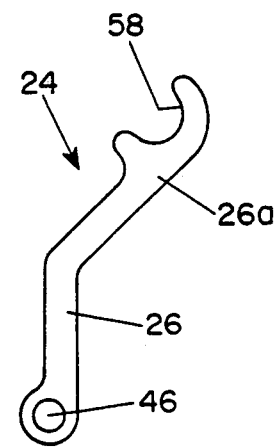

The bracket body member 16 and the claw member 24 are made by cutting them to the desired widths from aluminum extrusions having the profiles shown in FIGS. 9 and 14, respectively, machining them to form the final shapes (e.g., milling away material to form the arm portions 40 of the body member), and drilling the holes. The drawings do not show rubber pads, which are adhesively attached to the stay-engaging portions of the bracket body member and claw member and increase the friction between the bracket and the chain stay and protect the chain stay from marring.

The hitch is attached to the chain stay by first selecting the desired pivot position of the claw member (the holes 44), installing the claw member by inserting the pin 48, and positioning the bracket on the chain stay by lifting it up from below. At this point, the claw member is pivoted toward the bracket body member to engage the chain stay, the fastener screw 28 is inserted in the notch 60, and the barrel nut 56 is moved into the groove 58. The screw is hand turned, with the quick release lever 51 in the release position, to lightly clamp the bracket to the chain stay. The lever 51 is then thrown to the clamped position, which provides a suitable clamping force between the bracket and the chain stay to hold the hitch in position for use. Once the hitch is done up to a particular bicycle, it can be attached and detached without changing the location of the claw member in the body member.

To detach the hitch, the lever 51 of the fastener 28 is thrown to the release position, the screw is rotated enough to loosen the barrel nut sufficiently so that it can be popped out of the groove in the claw member, and the claw member is allowed to pivot away from the body member. The hitch can now be dropped down clear of the chain stay.

We claim:

1. A hitch for attaching a trailer to a bicycle comprising a mounting bracket adapted to be releasably attached to a chain stay of the bicycle frame and a resiliently flexible coupling member of an elastomeric material attached to the mounting bracket and adapted to be attached to a boom tube that is in turn attached to the trailer, the coupling member providing universal articulation between the mounting bracket and the boom tube, the mounting bracket including a bracket body member having a chain stay-engaging portion and a coupling attachment portion extending from the chain stay-engaging portion, the coupling member being attached to the attachment portion, a bracket claw member having a chain stay-engaging portion, the claw member being pivotally coupled adjacent one end of the chain stay-engaging portion thereof to the bracket body member, and releasable/adjustable fastener means coupled between the chain stay-engaging portion of the bracket body member and the other end of the chain stay-engaging portion of the claw member for selectively connecting the chain stay-engaging portions of the body member and claw member to each other in clamped relation to the chain stay.

2. A hitch according to claim 1 wherein the bracket body member has a pair of spaced-apart arm portions defining a slot between, them, the arms have a multiplicity of aligned holes, the claw member has a hole through it, and the claw member is pivotally attached to the body member by a pin received through a selected pair of the aligned holes in the arm portions of the bracket body and the hole in the claw member, whereby by selection of the holes in the bracket body arms the mounting bracket can be adjusted to fit chain stays of different sizes.

3. A hitch according to claim 2 wherein the arms of the body member and the fastener of the mounting bracket straddle the chain stay.

4. A hitch according to claim 2 wherein the fastening means includes a screw that passes though a hole in the bracket body member and having an eccentric quick release lever at one end that engages the bracket body member, and a barrel nut that is threaded onto the other end, wherein the barrel nut is releasably received in a groove in the bracket claw member, and wherein the groove is offset toward the bracket body member relative to the hole in the bracket claw member.

5. A hitch according to claim 1 wherein the coupling member includes an elongated arm portion of substantially uniform cross-section along its length, the area moment of inertia of the cross-section being substantially greater in the vertical direction than in the horizontal direction with respect to the bicycle such that the flexibility under lateral and torsional loads is substantially greater than the flexibility under vertical loads.

6. A hitch according to claim 5 wherein the attachment portion of the bracket body is bifurcated such as to define spaced-apart leg portions, and the coupling member is received between the leg portions in close-fitting relation thereto.

7. A hitch according to claim 6 wherein the coupling member includes a cylindrical boss portion at its end remote from the bracket, the boss portion being adapted to be received telescopically in the boom tube and joined to the boom tube by a fastener.

8. A hitch according to claim 1 wherein the fastening means includes a screw that passes though a hole in the bracket body member and having an eccentric quick release lever at one end that engages the bracket body member, and a barrel nut that is threaded onto the other end, and wherein the barrel nut is releasably received in a groove in the bracket claw member.

* * * * *